US005114100A

United States Patent [19]

Rudolph et al.

[11] Patent Number: 5,114,100
[45] Date of Patent: May 19, 1992

[54] ANTI-ICING SYSTEM FOR AIRCRAFT

[75] Inventors: Peter K. C. Rudolph, Seattle; Dezso Georgefalvy, Mercer Island, both of Wash.

[73] Assignee: The Boeing Company, Seattle, Wash.

[21] Appl. No.: 458,847

[22] Filed: Dec. 29, 1989

[51] Int. Cl.[5] .............................................. B64C 21/04
[52] U.S. Cl. ................................ 244/134 C; 244/130
[58] Field of Search ................ 244/134 B, 134 C, 130

[56] References Cited

U.S. PATENT DOCUMENTS

| | | | |
|---|---|---|---|
| 1,703,612 | 2/1929 | Corousso | 244/134 B |
| 1,879,717 | 9/1932 | Sikorsky | 244/134 B |
| 2,318,233 | 5/1943 | Keller | 244/134 C |
| 2,328,079 | 8/1943 | Goodman | 244/134 C |
| 2,390,093 | 12/1945 | Garrison | 244/134 C |
| 2,482,720 | 9/1949 | Sammons | 244/134 C |
| 2,625,010 | 1/1953 | Clark | 244/134 C |
| 2,630,965 | 3/1953 | Greatrex et al. | 244/134 C |
| 2,634,049 | 4/1953 | Hodges et al. | 244/134 C |
| 2,636,666 | 4/1953 | Lombard | 244/134 C |
| 2,668,596 | 2/1954 | Elliott | 244/134 C |
| 3,917,193 | 11/1975 | Runnels | 244/134 B |
| 3,933,327 | 1/1976 | Cook | 244/134 B |
| 3,981,466 | 9/1976 | Shah | 244/136 R |
| 4,099,691 | 7/1978 | Swanson et al. | 244/134 B |
| 4,508,295 | 4/1985 | Cattaneo et al. | 244/134 B |
| 4,575,030 | 9/1982 | Gratzer | 244/209 |
| 4,615,499 | 10/1986 | Knowler | 244/134 B |
| 4,741,499 | 5/1988 | Rudolph et al. | 244/134 B |
| 4,752,049 | 6/1988 | Cole | 244/134 B |

FOREIGN PATENT DOCUMENTS

| | | |
|---|---|---|
| 972392 | 3/1951 | France . |
| 504360 | 4/1939 | United Kingdom . |

*Primary Examiner*—Michael J. Carone
*Attorney, Agent, or Firm*—Hughes & Multer

[57] ABSTRACT

An anti-icing system for leading edges of an aircraft. Hot compressed air is discharged from a cavity behind the leading edge, through a multitude of small holes in the leading edge skin into the airflow impinging on the leading edge. In a first embodiment the anti-icing system utilizes part of the air distribution system in existence for a laminar flow control system. Instead of sucking air into the wing, as is done in the laminar flow control mode, the flow is reversed in the anti-icing mode, blowing hot compressed air out of the wing. In a second embodiment the anti-icing system is used solely in the anti-icing mode.

23 Claims, 8 Drawing Sheets

ANTI-ICING SYSTEM FOR AIRCRAFT

FIELD OF THE INVENTION

The present invention relates to an aircraft system which provides anti-icing, and which also can be arranged to operate in an alternative mode to provide anti-icing or boundary layer control.

BACKGROUND ART

The most widely used wing anti-icing system in commercial turbo-fan aircraft is the bleed air system. In this system, high pressure, high temperature air is fed from the compressor section of the engine and discharged through a perforated tube positioned within a leading edge chamber of the wing (or other aircraft structure) as a spray against the inner surface of the wing leading edge skin. This bleed air anti-icing system is generally an "on-off" type system without any modulating capability. The sizing criteria for the system is a maximum anti-icing effort during idle descent. Since bleed air temperature and pressure are very low at this power setting, the mass flow must be high. Therefore, the system is oversized and wasteful during less demanding conditions(thus resulting in a case of "overkill" under other conditions where icing can occur such as when the aircraft is climbing, with the engines operating at a much higher power setting).

The anti-icing air, after heating up the inside of the leading edge skin, is ducted overboard at a fairly high temperature. This dump loss can exceed 50% of the energy supplied.

Another consideration is that as turbo-fan engines are designed for higher propulsion efficiency, the gas generators become smaller and the penalties from bleed air become larger. On a modern turbo-prop engine, the gas generators are becoming so small that the amount of bleed air required for anti-icing and cabin pressurization/ventilation (Environmental Control System) can become prohibitive.

There are a number of other deicing and/or anti-icing systems in use other than the engine bleed air system described above. One such system is to utilize inflatable rubber boots at the aircraft leading edge portions, this being widely used for deicing on slower propeller airplanes. However, the boot does not provide a smooth enough surface for high performance aircraft. Also, the boot needs fairly frequent replacement due to erosion and aging.

Glycol anti-icing is another system, where the glycol is discharged over the surface areas where anti-icing is desired. However, this leaves a sticky residue on the wing which helps collect dust, so that frequent wing cleaning is required. Further, the cost and trouble of refueling glycol tanks are undesirable features.

Yet another approach is to utilize electric resistance heaters attached to the outside or inside of the leading edge skin. This can be a very energy efficient system. A drawback is that in the case of a defect, field repair can be difficult and there am be a lay up of an aircraft for an undesirably long period of time.

A search of the patent literature has disclosed a number of U.S. and foreign patents, these being the following.

U.S. Pat. No. 1,703,612 (Corousso) shows a variety of deicing configurations for a biplane. In FIGS. 10, 11, and 12, there is illustrated a distribution pipe 24 having an arcuate cross section, with exhaust nozzles 25 extending from the top and bottom edges of the pipe, so that hot air introduced into the pipe 24 escapes from these nozzles, and travels rearwardly along the wing. Thus, it would appear that the leading edge portion of the pipe 24 would be deiced (or have anti-icing) by reason of heat conduction through the forward portion of the pipe.

U.S. Pat. No. 2,318,233 (Keller) shows a variable pitch propeller for a piston powered aircraft. There is a double walled spinner at the front of the propeller shaft. The inner wall of the spinner has openings 9 through which hot air flows to exhaust over the exposed surface of the spinner at locations downstream of the further forward surface of the outer wall of the spinner.

U.S. Pat. No. 2,328,079 (Goodman) discloses a hollow boot which extends along and covers the leading edge of the wing. Hot air heats the boot by conduction, and this air then escapes through a slot at the rear of the boot to flow rearwardly over the wing surfaces.

U.S. Pat. No. 2,390,093 (Garrison) utilizes a porous sintered metal plate which forms the leading edge of the wing. Pressurized air carrying an atomized or vaporized deicing fluid moves through the porous metal plates to flow to the exterior surface of the leading edge and distribute the deicing fluid over the leading edge surface. The patent indicates that good results may be obtained with sintered metal sheets which pass air at the rate of 0.125 cubic feet per minute at a pressure drop of 39 inches of mercury. The patent also points out that experimental tests have shown that an air pressure of about 45 PSI is required to break up a heavy layer of ice when air alone is used, while a pressure of 10 PSI is sufficient for deicing when atomized or vaporized deicing fluid is mixed with the air. Thus, it would appear that the air is not used primarily to provide heat for deicing, but in one mode serves to carry the deicing fluid to the leading edge surface while in another mode the pressure of the air is utilized to break loose the ice which has already formed.

U.S. Pat. No. 2,482,720 (Sammons) discloses an anti-icing system for a turbo-engine. Hot air within a cavity heats an outer engine wall surface and an engine spinner by conduction. Then the slightly cooled air is exhausted outwardly through apertures in the inner engine inlet and the spinner to heat their respective surfaces at a further rearward location.

U.S. Pat. No. 2,625,010 (Clark) shows a gas turbine engine inlet anti-icing system which uses an auxiliary combustion chamber to create gasses for distribution to an engine inlet area during periods of low compressor bleed air availability. There are apertures in the interior of the engine inlet, used for exhausting the heating gas after this gas has heated the leading edges by conduction.

U.S. Pat. No. 2,630,965 (Greatrex et al) discloses a gas turbine engine inlet anti-icing system. The leading edges and exterior of the engine are heated by conduction through the skin from hot gasses circulated in an interior cavity. The slightly cooled gasses are then exhausted into the air stream from trailing edge apertures in stator or rotors.

U.S. Pat. No. 2,634,049 (Hodges) discloses a gas turbine engine inlet anti-icing system. The inlet guide vanes in FIG. 6 are shown having apertures or slots 56 which are formed on opposite sides of (and rearwardly of) the leading edge 55 of the guide vanes. The heated air is directed through the apertures 56 to flow over the upper and lower surfaces of the guide vanes, but not over the leading edges thereof.

U.S. Pat. No. 2,636,666 (Lombard) discloses a gas turbine engine where there is a forward wide mesh grid-like structure 17 extending across a forward portion of the engine inlet. Rearwardly of the grid 17, there is a second guard grid 19 of wire mesh which extends across the air intake guide to prevent any foreign matter. such as stones from entering the compressor and damaging the compressor blades. Hot gas is fed into the grid-like structure 17 which has outlets at the trailing edges of the members of the grid 17 so that the hot gas is delivered into the air intake duct 18 and thus reduce the possibility of ice formation on the guard grid 19 and other components.

U.S. Pat. No. 2,668,596 (Elliot) discloses a turbo-prop engine having the surface of the interior wall of the nacelle formed with apertures. Heated air is directed into the forward portion of the nacelle to heat the leading edge of the nacelle by conduction, after which the air is discharged through the interiorly directed apertures to flow rearwardly into the engine inlet.

U.S. Pat. No. 3,933,327 (Cook) provides for anti-icing of the inlet of a gas turbine engine. The hot gas heats the leading edge of the nacelle by conduction, with the slightly cooled gasses then being exhausted through a perforated acoustical member which is located rearwardly of the inlet lip.

U.S. Pat. No. 3,981,466 (Shah) discloses an anti-icing system for a gas turbine engine which provides heat by conduction from internal passages. The cooled anti-icing air is then utilized for heating in the interior space of the aircraft.

U.S. Pat. No. 4,099,691 (Swanson et al) discloses a boundary layer control system for aircraft where hot bleed air from the engine is directed to a number of manifolds located in a spanwise arrangement along the wing. A single row of air discharge openings (see FIGS. 9 and 10) are provided at an upper location adjacent to the leading edge of the wing to cause the boundary layer control air to flow upwardly along the upper wing surface aft of the leading edge. The patent is directed toward the thermal stress and aerodynamic problems associated with such boundary layer control systems.

U.S. Pat. No. 4,615,499 (Knowler)shows an improved "trombone" fitting in deploying leading edge slats.

British Patent Specification 504,360 (Spearpoint et al) discloses a lift increasing arrangement where high velocity air from the prop wash is collected and distributed spanwise along the wing. Then air is discharged upwardly and outwardly from a slot located slightly rearwardly of the leading edge so that the discharged air flows rearwardly along the upward surface of the wing. A heater in the duct provides anti-icing when required.

French Patent 972,392 (Greenly) discloses what appears to be an anti-icing method for the spinner and nacelle on a turbo-prop engine. A translation of this patent is not available, but it appears that the leading edge is heated by conduction, and then the hot gasses are exhausted from slots located at the interior of the nacelle rearwardly of the leading edge. It also appears that air is discharged from a single slot at the nose of the spinner toward a forward shield with this air then flowing so as to be radiating outwardly and rearwardly along the spinner.

SUMMARY OF THE INVENTION

The present invention comprises an aircraft structure having a skin section with a leading edge and with a first forwardly facing leading edge portion which is that portion of the skin portion most susceptible to icing. There is a second surface portion which extends rearwardly from the first leading edge surface portion to receive airflow from said leading edge surface portion and which is less susceptible to icing. the first leading edge surface portion is formed with a plurality of through air openings which are located over a substantial surface area of the first leading edge surface portion and which lead from an inside location of said skin section to an outside location of said skin section.

There is airflow means to deliver pressurized hot air to the inside location to cause the pressurized hot air to flow outwardly through the air openings over the first surface portion, thus heating up the first surface portion and adjacent boundary layer flow to inhibit icing on said first surface portion. The hot air then flows rearwardly over the second surface portion at a flow volume and temperature sufficient to also inhibit icing on said second surface portion.

The air supply means is also arranged with a suction means to create a lower pressure at the inside location in a manner that boundary layer air is drawn inwardly at least through some of the air openings. This is shown in a first embodiment of the present invention. The purpose of a laminar flow control system is to reduce drag by maintaining a laminar boundary layer. The system shown is a hybrid laminar flow control system, "hybrid" meaning that laminarization is achieved partly by suction (leading edge portion), and partly by proper draping of the airfoil section (in the spar box region). In the preferred form, the suction system extends from the leading edge to near the front spar and on the upper surface only. Thus, laminar flow is achieved on the upper surface to about fifty percent of the wing chord.

The suction system for laminar flow control requires a perforated leading edge skin. In a preferred configuration, suction flutes On the backside of the skin are formed by spanwise stringers and an inner skin. The flutes divide the section area into a multitude of chordwise zones that follow lines of isobars on the outside of the skin. The suction flutes are connected to collectors through controlled orifices in the inner skin. In the particular system shown in the first embodiment, the system has five chordwise collectors, which are repetitive spanwise. A ducting system with flow control valves connects the suction area with a suction pump.

For high lift at low speed and to prevent leading edge contamination with insect strikes at low speed, low altitude, a folding bullnose Krueger flap is required, which has to fit into the leading edge cavity in addition to the suction flutes and the ducting.

With the suction panel, the ducting, the leading edge support ribs, the Krueger flap and its actuation all competing for space in the leading edge cavity, there is no space for installation of an anti-icing system of any sort. The present invention therefore utilized the most forward portion of the suction system for anti-icing. In the anti-icing mode the suction pump is shut down and engine bled air is ducted into the forward portion of the duct system. This hot bleed air exits through the perforations in the leading edge skin and starts to mix with the boundary layer. This process brings the heat right to the spot where it is needed to keep the leading edge free of ice. It is therefore more efficient than the spray tube anti-icing system and requires a smaller amount of bleed air.

The laminar flow suction system extends from the wing leading edge up and aft. For proper anti-icing the area two to three inches down and aft of the wing leading edge also needs to be protected. This is accomplished by allowing hot pressurized air to enter this special flute through check valves.

The boundary layer hot air injection anti-icing system is inherently more efficient than the spray tube internal convection system. Therefore, in a second embodiment, the hot air injection anti-icing system is used on conventional airplane leading edges such as slats, empennage leading edges or engine inlets. There is no boundary layer control function. The hot anti-icing air is ducted into the leading edge cavity and is injected into the leading edge boundary layer through small perforations in the leading edge skin.

In cruise or any time the anti-icing system is not operating; there exists a pressure gradient on the surface of the leading edge. This gradient is strongest on lifting surfaces such as wing leading edges or engine inlets. The gradient may set up a circulation inside the leading edge cavity, with flow exiting through the perforations in areas of low pressure and entering the cavity in areas of higher pressure. The flow exiting the perforations could be somewhat detrimental to the external boundary layer development and may cause an increase in drag and reduced lift.

Therefore, the leading cavities need to be compartmented to prevent this circulation during flight without anti-icing. In the anti-icing mode flow from the supply duct can enter the other compartments through check valves in the baffle walls.

In a further embodiment, the source for the anti-icing air is changed from engine bleed air to the air compressed by an electric motor driven compressor and heated by an electric duct heater.

Also the system can be made modular, i.e. there are a multitude of these compressor/heater units per wing surface (This principle is incorporated in U.S. Pat. No. 4,741,499, which is incorporated herein by reference).

In the application of this variation to the first embodiment, the electric motor driven compressor becomes the suction pump for the laminar flow control function and the source of compressed air for the anti-icing function, with the electric duct heater generating most of the temperature rise. The area covered by one modular unit may cover one or two Krueger elements. The multiplicity of units provides redundancy, so that a single failure will only affect a small portion of the wing in either the boundary layer control mode or the anti-icing mode.

In the application of this further embodiment the advantage of redundancy in the multiplicity of modules would be realized. Typically there would be one module per slat; two modules per engine inlet, or three to four modules per empennage surface.

These features will become apparent from the following detailed description.

DESCRIPTION OF THE PREFERRED EMBODIMENTS

Figure 1:
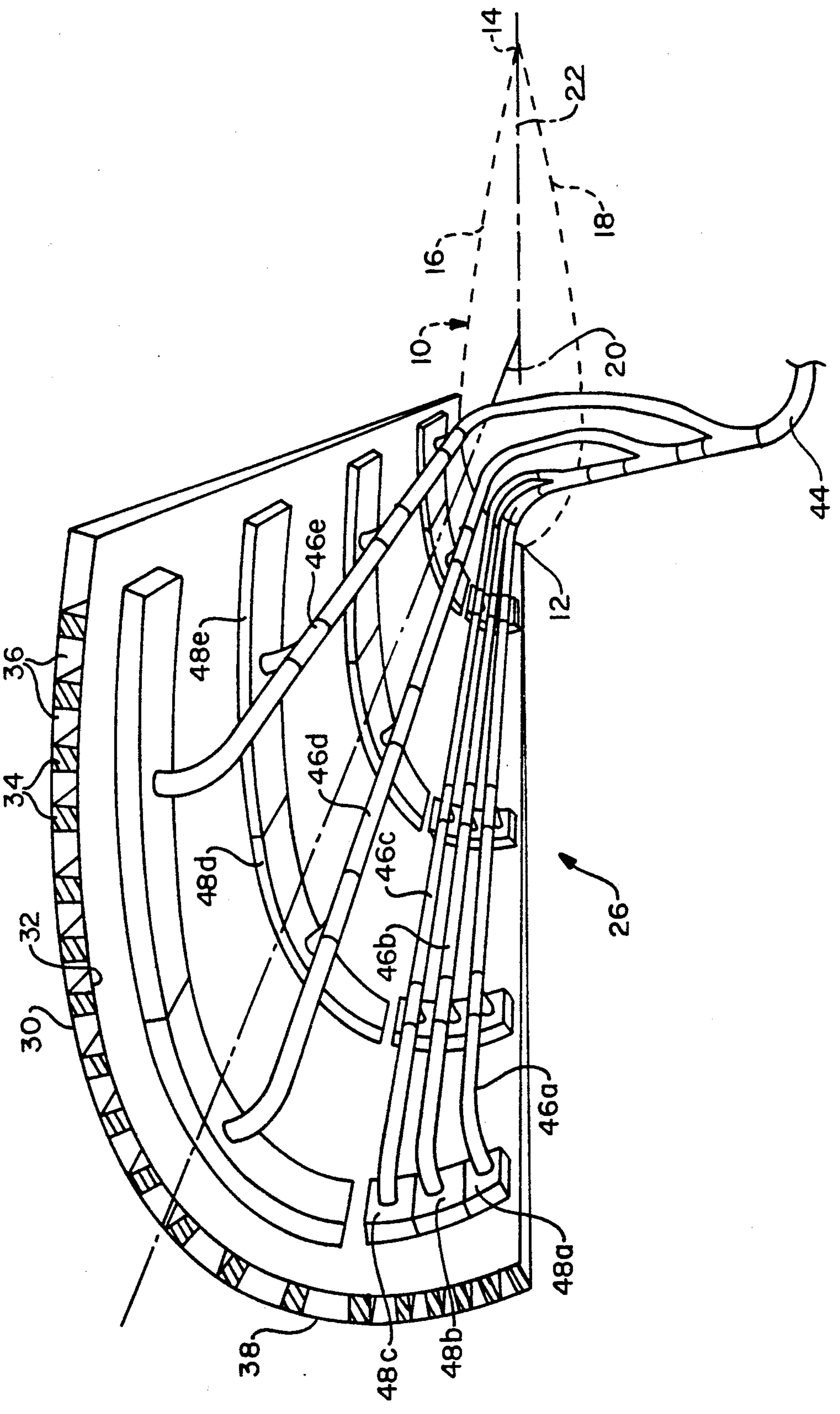
FIG. 1 is a perspective view showing from an interior location a leading edge and upper forward surface portion of a wing with the ducting system for boundary layer control of an aircraft incorporating a first embodiment of the present invention.

In FIG. 1, there is shown somewhat schematically in broken lines an air foil 10, having a leading edge 12, a trailing edge 14, an upper surface 16, and a lower surface 18. Further, the air foil 10 has a spanwise axis 20 and a chordwise axis 22. Only an upper forward portion of this air foil 10 is shown in full lines in FIGS. 1 and 2, this being adequate for disclosing the present invention.

Figure 2:
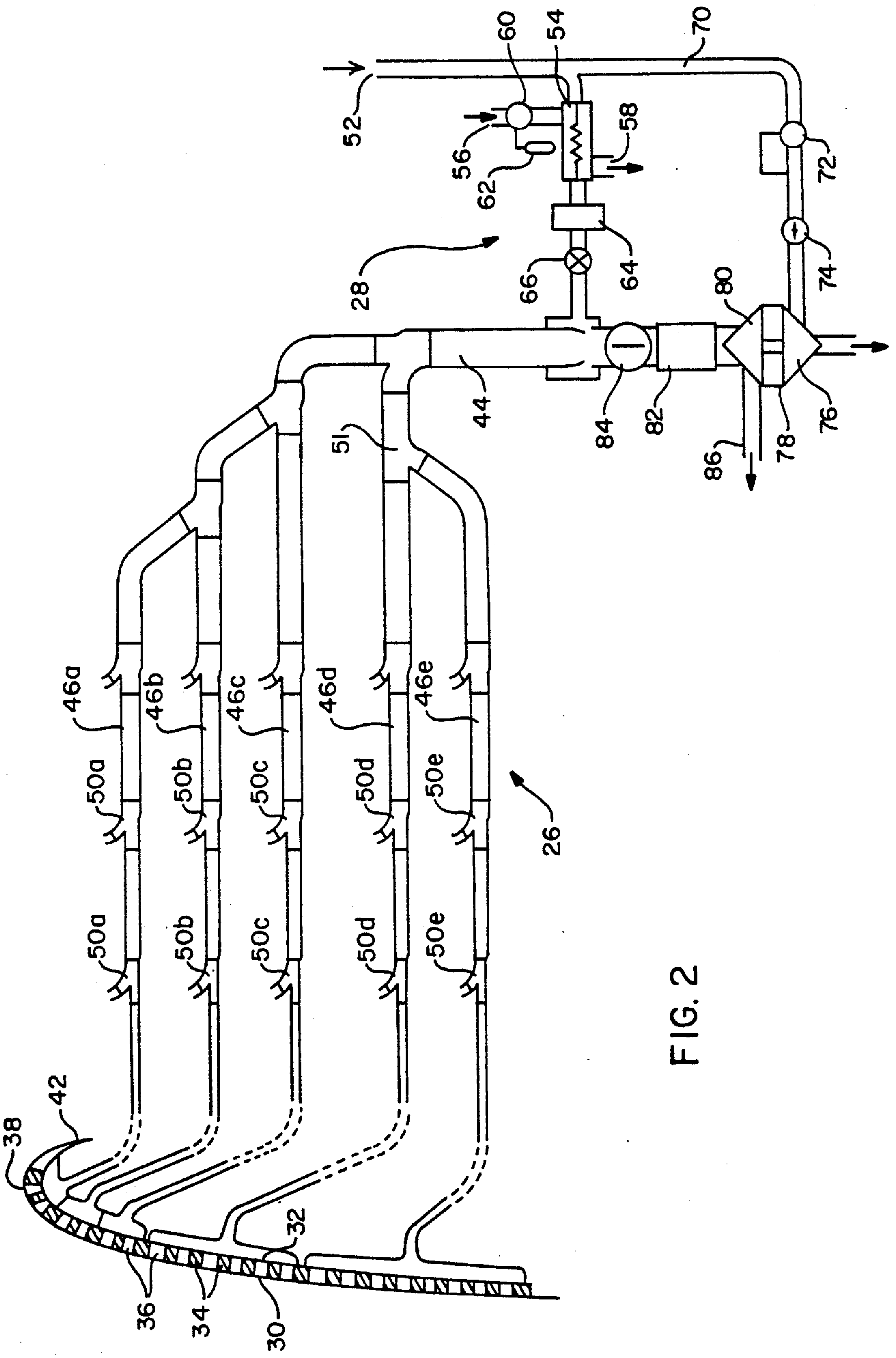
FIG. 2 is a diagramatic view illustrating the flow distribution system which can be operated in either the anti-icing mode (where pressurized hot air is delivered to the wing) and also the boundary layer control mode (where suction is provided to draw in air through openings in the wing surface).

There is shown in both FIGS. 1 and 2 a skin section 24 of the air foil 10 and a manifold system 26. In FIG. 2 only, there is shown an air flow control system 28 which can be operated in one of two modes. In the first mode, the air flow control system 28 provides a suction imposed in the manifold 26 to draw in ambient air through the skin section 24 for boundary layer control. This can be done in accordance with the teachings formulated by Mr. Bernard Gratzer and disclosed in previously issued U.S. Pat. No. 4,575,030. In a second mode, this air flow system 28 delivers hot pressurized air through selected portions of the manifold system 26 to provide anti-icing.

With reference to FIG. 1, the skin section 24 comprises an outer skin 30, an inner skin 32, and a plurality of spanwise extending stringers 34 which are connected to both the inner and outer skins 30 and 32 in a manner to define a plurality of span-wise extending flutes or passageways 36. The outer skin 30 is a perforated skin (desirably made of titanium) having a plurality of small openings 37 extending over substantially the entire skin area where boundary layer control and/or anti-icing is to take place. (Since the diameter of the openings 37 are very small, the actual openings 37 are not shown, and only one opening 37 is shown drawn to an enlarged scale in FIG. 5A.)

The very leading edge location (indicated at 38 in FIG. 1) is most susceptible to ice formation.

The manifold system 26 comprises a main duct 44 which is connected to a plurality of spanwise extending ducts 46, each of which is connected to a plurality of chord-wise extending collector 48. In this first embodiment, there are five spanwise ducts 46, and these are designated 46*a*, 46*b*, 46*c*, 46*d*, and 46*e* respectively. At each collector station there are five separate collectors, with each of these being designated 48*a*, 48*b*, 48*c*, 48*d*, and 48*e*, respectively. The span-wise duct 46*a* connects to each of the chord-wise duct sections 48*a* through respective flapper valves designated 50*a* (See FIG. 2). In like manner, the next span-wise duct 46*b* connects to each of the chord-wise duct sections 48*b* through respective flapper valves 50*b*, with this same pattern being followed on through to the fifth span-wise duct 46*e* connecting through respective flapper valves 50*e* to the collector 48*e*. Also, there is a main flapper valve 51 which shuts off flow to both spanwise ducts 46*d* and 46*e*. It will be noted that the various collectors 48*a, b, c, d* and *e* have varying chord-wise length dimensions, the reason for this being to achieve desired flow distribution. This will be described later herein. Further, the arrangement of the duct sections 48*a–e* are shown more accurately in FIG. 1, relative to location on the wing.

With further reference to FIG. 2, the airflow control system 28 has a bleed air supply inlet 52 into which flows bleed air from the compressor section of the engines. This bleed air would typically be at temperature level of between 250° to 400° degrees F. and a pressure of 25 to 50 PSI, depending upon the operating mode of the engines.

For the anti-icing mode, the bleed air is directed first through a heat exchanger 54 which has a ram air inlet 56 into which flows ram air to be used as a cooling medium in the heat exchanger 54. This cooling air in turn flows through an outlet 58 overboard. A regulator valve 60 is provided along with a temperature sensing device 62 to control the flow of ram air so as to bring the bleed air to the appropriate temperature level (e.g., 200° to 300° degrees F.) to protect the leading edge structure from overheating, yet hot enough for anti-icing. The bleed air flows from the heat exchanger 54 through a filter 64 and thence through a pressure regulator shut off valve 66 to the main duct 44.

In the boundary layer control mode, the bleed air flows from the inlet 52 through the line 70 through a turbine speed control valve 72, thence through a shutoff valve 74 to a turbine 76 of a turbo compressor 78. The turbo compressor 78 has a compressor section 80, the intake end of which attaches through a muffler 82 and through a shut off valve 84 to connect to the main duct 44. Thus, the compressor section 80 provides a suction in the main duct 44 and discharges the air from the duct 44 through an exhaust line 86.

Figure 5:
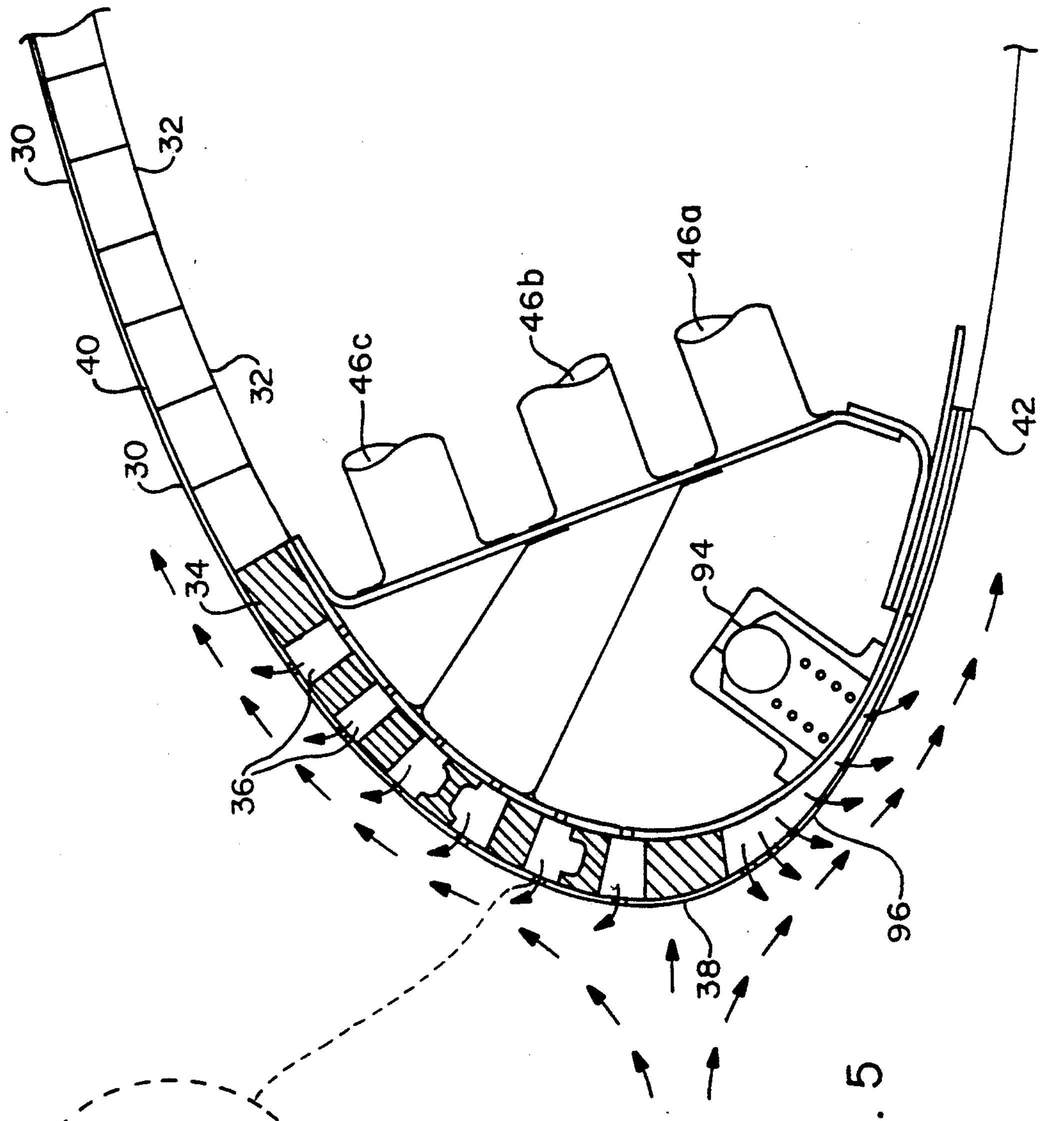
FIG. 5 is a cross sectional view of a leading edge section of a wing designed for boundary layer control, such as shown in FIGS. 1 and 2, showing a check valve used to allow bleed air to exit the lower most openings in the anti-icing mode.
Figure 5A:
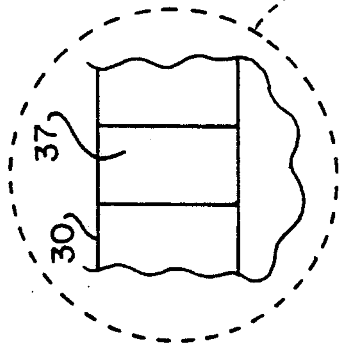
FIG. 5A is a cross sectional view of one of the openings in the outer skin, drawn to an enlarged scale.

In FIG. 5, which is a cross-sectional view of the wing leading edge portion 12, there is shown one of a plurality of check valves 94 mounted to the inner skin section 32 in one of the duct sections 48*a*, and leading to the flute or passageway 36 which is at a lower area 96 of the outer skin section 30. The reason for this check valve 94 is that while it is necessary to de-ice this lower area 96, there is no benefit in providing suction at this area 96 for boundary layer control. Accordingly, the check valve 94 permits only an outflow of air during the anti-icing mode, but blocks airflow inwardly through the openings in the skin section 30 during the boundary layer control mode.

Figure 3:
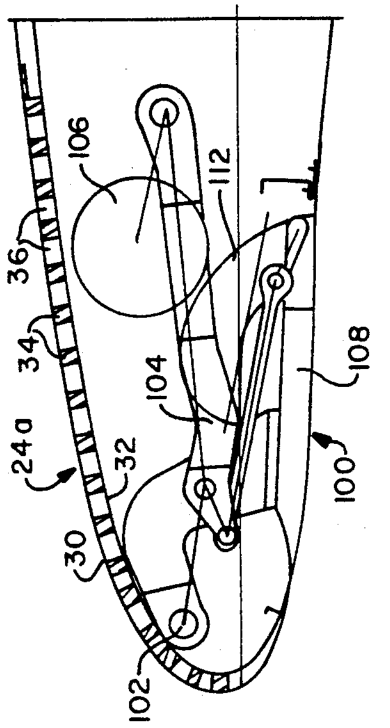
FIG. 3 is a sectional view of a leading edge portion of a wing, taken in chordwise section, illustrating a wing constructed in accordance with the first embodiment of the present invention and incorporating a Krueger Flap in the stowed position.
Figure 4:
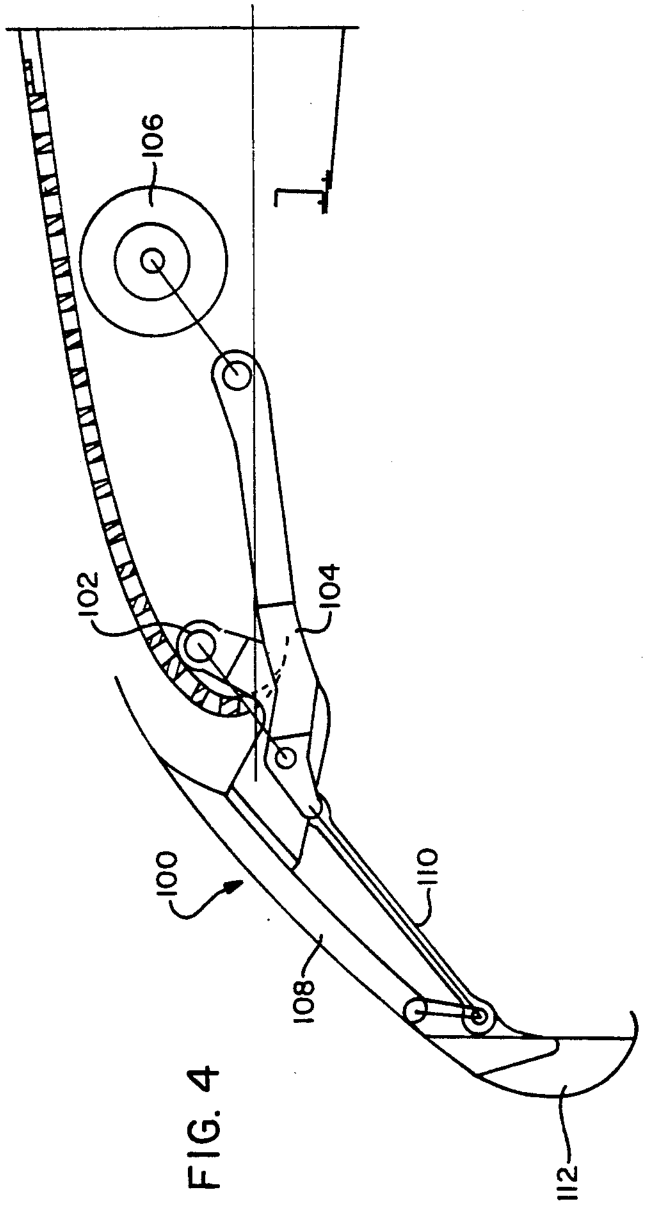
FIG. 4 is a view similar to FIG. 3, showing the Krueger Flap in its extended position.

FIGS. 3 and 4 show another feature of the first embodiment of the present invention incorporated in a wing 10*a* having a Krueger flap 100. This Krueger flap 100 is or may be of conventional design, with the flap 100 being pivotally mounted at 102, and being operated by a drive arm 104 operatively connected to an actuating shaft 106. The arm 104 moves the main flap section 108 between the stowed position of FIG. 3 and the extended position of FIG. 4, while an associated drive link 110 operates to further extend the nose section 112 of the flap 100.

The Krueger flap is an inherent part of this hybrid laminar flow control system for the upper wing surface. It serves two functions. The first is as a high lift device for take-off and landing. The Krueger stows in the lower surface of the wing and allows a smooth upper surface, which is a necessity for laminar flow control. A slat, for example stows on the upper surface of the wing and forms a step with the fixed upper wing surface, which is incompatible with laminar flow control.

The second function of the Krueger is to protect the wing leading edge from insect contamination at low altitudes and lower speeds. The Krueger flap forms a "bug shield" for the fixed leading edge. The majority of insects impact on the Krueger bullnose, which stows inside the leading edge cavity.

To describe the operation of the present invention, let it be assumed that the airplane is to operate in the anti-icing mode. The bleed air from the engines passes into the inlet 52 and through the heat exchanger 54, thence through the filter 64 and also through the pressure regulating valve 66 into the main duct 44. As indicated previously, ambient air enters the ram air inlet 56 to pass through the heat exchanger 54 and thence through the outlet passageway 58 so as to bring the bleed air to a temperature compatible with the bonded leading edge structure. The temperature sensing device 62 is provided for regulation of the control valve 60. During the anti-icing mode, the turbo compressor 78 is shut down, and the shut off valve 74 is closed.

During the anti-icing mode, it is not necessary to discharge hot air through the more rearwardly positioned duct sections 48*d* and *e*. Accordingly, the main flapper valve 51 is moved to its closed position to prevent flow into the spanwise ducts 46*d* and 46*e*. The flapper valves 50*a*, 50*b*, and 50*c* remain open so that hot air flowing into the main duct 44 passes into the spanwise duct sections 46*a*, 46*b*, and 46*c* and thence into the more forward chordwise duct sections 48*a*, 48*b*, and 48*c*. The hot air flows outwardly through the openings 37 in the skin section 30. The hot air that flows outwardly through the openings 37 displaces the existing boundary layer mixes with it and shields the outer surface of the skin section 30 with a layer of warm air. This hot layer of air flows rearwardly over the upper and lower surfaces of the airfoil 10 so that the anti-icing effect occurs also over surface areas a moderate distance rearwardly of the locations of the openings 37 through which the hot anti-icing air is discharged.

It should be noted that the system of the present invention operates rather differently than the conventional anti-icing system where hot air is sprayed against the inside surface of the leading edge skin so that anti-icing is accomplished by means of conduction to the outside surface of the skin. The weak link in this prior art system is the convection on the inside surface, requiring high velocities and temperatures of the de-icing air to achieve adequate conduction of the heat through the skin to the outer surface. In the system of the present invention, the hot air is brought directly to the outer surface of the skin section 30, displacing the existing boundary layer. This system does not depend on internal convection alone, but there is also convection as the hot air passes through the perforations and as it scrubs the outer surface. In other words, the entire leading edge skin is submerged in hot/warm anti-icing air.

Let it now be assumed that the system of the present invention is to be operated in the boundary layer control mode, so that boundary layer air is sucked into the openings 37 in the outer skin section 30. In this mode of operation, the shut off valve 66 is closed, and the valve 74 is opened. The bleed air flowing into the inlet 52 flows through the turbine speed control valve 72 to the turbine section 76 of the turbo compressor 78. This causes the turbo compressor 78 to operate so that the compressor section 80 draws in air from the main duct 44, thus creating a reverse flow in the ducts 46*a–e*, and 48*a–e*, with outside air being drawn inwardly through the openings 37. As is well known in the art, this drawing in of the boundary layer air reduces disturbances in the boundary layer and delays transition from laminar to turbulent boundary layer reducing drag and improving performance.

During the boundary layer control mode of operation, all of the flapper valves 50*a*–50*e* and 51 are open so that outside air is drawn into all of the chordwise collector sections 48*a–e*. However, as noted previously, the check valves 94 (see FIG. 5) are provided at certain locations in the collector sections 48*a* to prevent the outside air from entering the openings 37 at the lower surface areas 96. As indicated previously, the reason for this is that boundary layer control of the lower wing surface is not intended in this scheme.

The turbine speed control valve 72 is made to be responsive to rotational speed of the turbo compressor 78 so as to control the flow of air thereto and thus regulate the speed of the turbo compressor 78.

Figure 6:
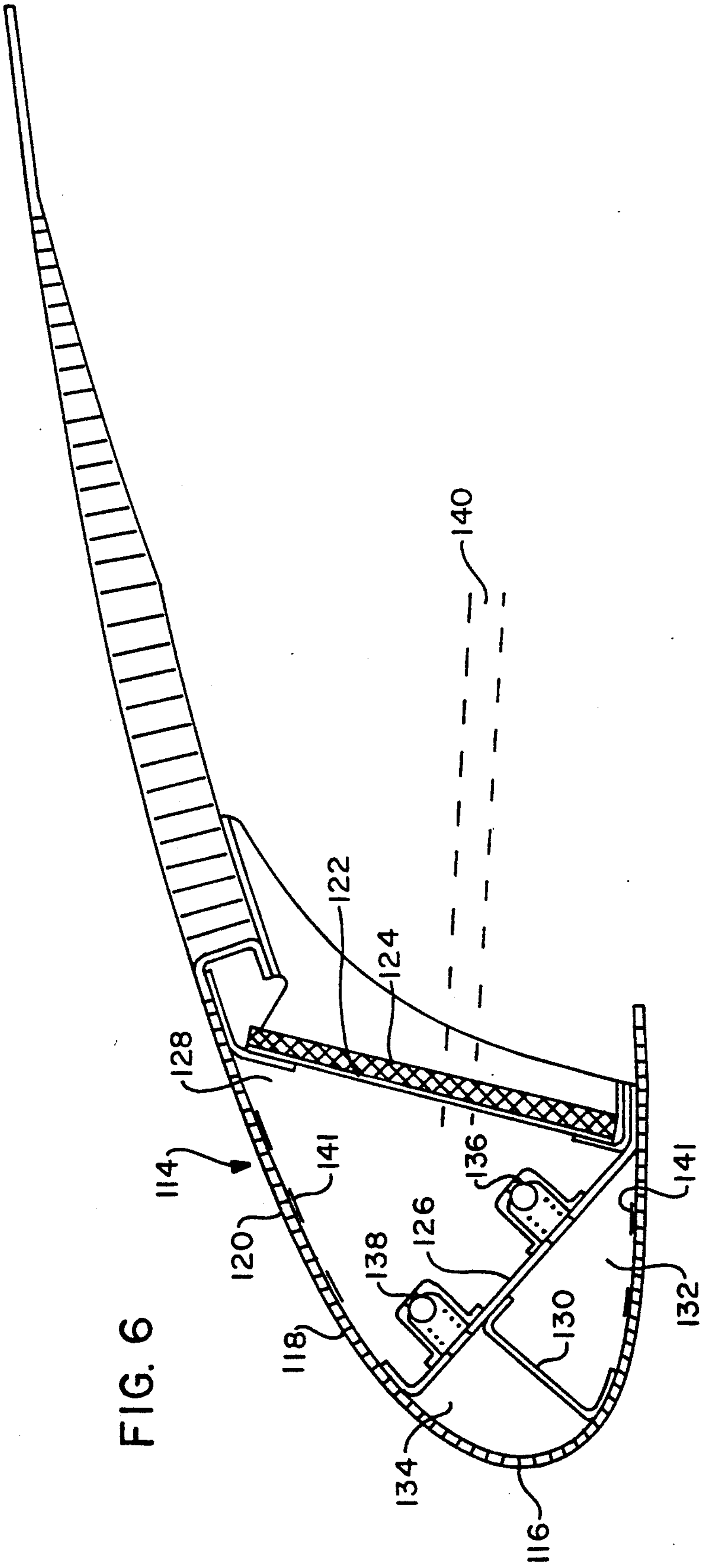
FIG. 6 is a sectional view along a chord-wise axis of a leading edge slat showing a second embodiment of the present invention configured to operate in the anti-icing mode only.

FIG. 6 shows a second embodiment where the hot air injection anti-icing principle is utilized on a conventional wing with leading edge slats. There is a leading edge slat 114 having a nose section 116 with only an outer skin 118 having a plurality of openings 120 therein.

The nose section 116 has a spanwise extending spar 122 which has on its rear surface a layer of insulation 124. There is a first baffle plate 126 which defines with an upper portion of the skin 118 and the spar 122 a first chamber or duct section 128. There is a second baffle plate 130 which extends from an intermediate location at the first baffle plate 126 to a lower forward portion of the skin section 118 to form two other chambers or duct sections 132 and 134, respectively.

There are two series of check valves 136 and 38 which are mounted to the first baffle plate 126 so as to permit flow from the first chamber or duct section 128 into the other two duct sections 132 and 134, respectively. Anti-icing air is directed into the chamber 128 through a suitable conduit, such as a "trombone" type connection, a portion of which is indicated schematically at 140. As the pressurized hot air flows into the chamber 128, this opens the two series of check valves 136 and 138 so that the air flows from the chamber 128 into the two chambers 132 and 134. The hot anti-icing air flows out through the openings 120 to accomplish the anti-icing function as described above.

The reason for the check valves 136 and 138 is as follows. With the slat 114 in its stowed position, the nose section 116 forms the leading edge of the airfoil 10*a*. There is on the leading edge portions of lifting surfaces large streamwise (i.e. chordwise) pressure gradients. If the leading edge section were made with one large leading edge chamber or duct, the perforated skin would allow circulation from the lower forward skin portion (where pressure is higher) into the duct and out an upper skin portion (where pressure is lower) during periods when the anti-icing system is turned off (i.e. in cruise condition). This circulation could cause a drag penalty. Therefore, there are provided separate chambers or ducts 128, 132 and 134 with the appropriate check valves 136 and 138 to prevent that pattern of flow when the anti-icing system is off. Thus, during cruise, the springs in the check valves 136 and 138 (plus the air pressure in the chambers 132 and 134) cause the valves 136 and 138 to close. In order to optimize the flow of anti-icing air, the openings 120 in the outer skin 118 should not be uniform in the chordwise direction. The largest demand for anti-icing air is at the very leading edge of the airfoil in the region of duct section 134. There is lesser demand for hot air downstream, i.e. the duct sections 128 and 132. So the optimized skin has a denser patter of openings 120 in the nose section with a gradual decrease in a chordwise direction. The non-uniform pattern of openings in the leading edge skin may be difficult and expensive to manufacture. To achieve a similar effect with a uniform pattern of openings throughout the leading edge skin, flow blocking strips 141 may be used. These metal strips are bonded to the inner surface of the skin and run in a spanwise direction. In the slat of FIG. 6 they would be used primarily in duct sections 128 and 132.

Figure 7:
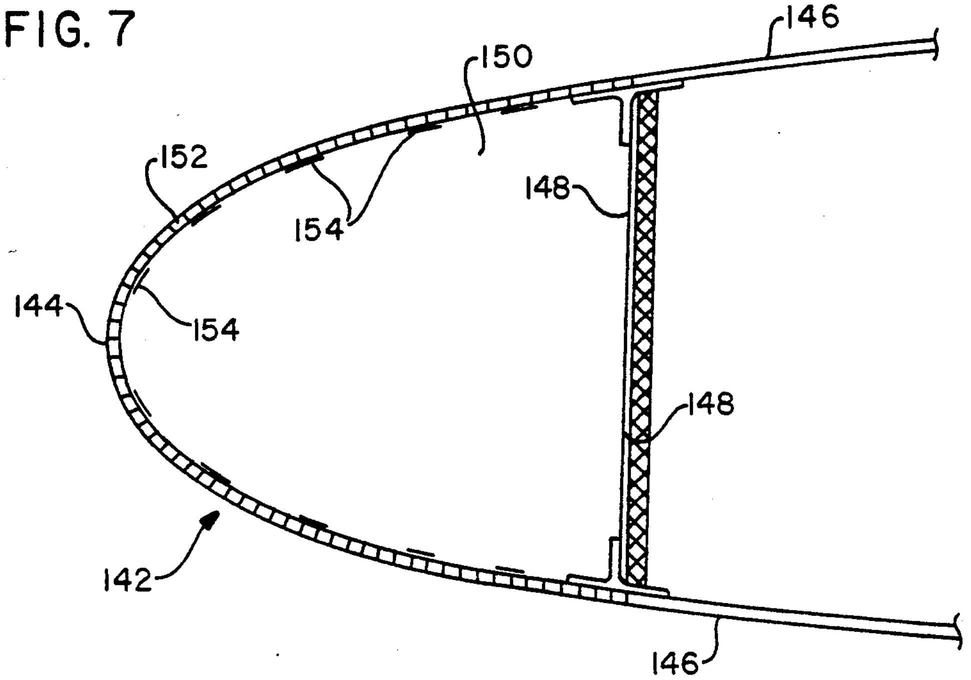
FIG. 7 is a cross sectional view taken along a chordwise axis of a member having non-lifting surfaces (e.g., a vertical fin or a strut) showing a third embodiment of the present invention which operates only in an anti-icing mode.

FIG. 7 shows a third embodiment of the present invention incorporated in the leading edge of a non-lifting aerodynamic member, such as a vertical fin or a strut. Thus, there is shown a leading edge portion 142 having a forward skin section 144 which extends rearwardly to join to two rear skin sections 146. There is an insulated bulkhead 148 that defines with the forward skin section 144, a single spanwise extending chamber 150. The forward skin portion 144 is provided with a plurality of openings 152 over its entire surface to the location of the bulkhead 148.

The optimization of anti-icing air outflow over the chordwise length of the leading edge is accomplished with either a variable density of the perforations or, if using constant density perforated skin, with series of blocking strips 154, such as the blocking strips 141, described with reference to FIG. 6.

Figure 8:
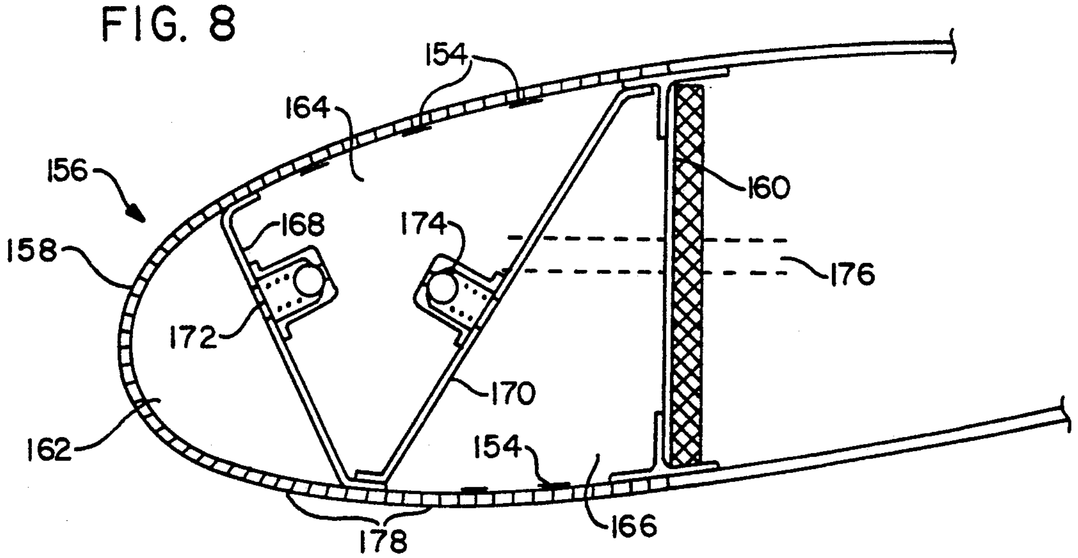
FIG. 8 is a longitudinal sectional view of a forward nacelle portion of an engine inlet, incorporating yet a fourth embodiment of the present invention, which operates only in an anti-icing mode.

A fourth embodiment is shown in FIG. 8, and this is a cross-sectional view of a leading edge section 156 which could desirably be used in an engine inlet or possibly for a horizontal tail leading edge. This leading edge section 156 has a forward skin section 158 which forms with a spanwise spar or bulkhead 160, a de-icing area which is divided up into three chambers 162, 164 and 166. More specifically, there is a forward baffle 168 which defines with the most forward part of the skin section 158, the chamber 162, and a second baffle 170 which forms with the baffle 168 and an upper portion of the skin portion 158, the chamber 164. The third chamber 166 is defined by the second baffle 170, a lower portion of the skin section 158 and the spar or bulkhead 160.

There is a first check valve 172 which permits flow from the upper middle chamber 164 into the forward chamber 162, while a second check valve 174, mounted to the second baffle 170, permits flow from the upper middle chamber 164 into the rear lower chamber 166. Reverse flow through these check valves 172 and 174 is, of course, blocked. The de-icing air is fed through a suitable conduit indicated schematically at 176, into the middle chamber 164, to flow from this chamber 164 into the other two chambers 162 and 166. There are openings 178 over the entire skin section 158 so that the hot anti-icing air flows from all three sections 162, 164 and 166 outwardly through the adjacent portions of the skin section 150. However, when the anti-icing system is shut down, air flow at the higher pressure skin surface areas is prevented from flowing into the chambers 162 and 166 and thence into the chamber 164. As indicated previously, if the air flow were permitted into the chamber 164, this air would exit through the openings 178 adjacent to a forward upper skin surface portions and this could cause a drag penalty.

Variable density perforations or blocking strips 154 are used to optimize the flow quantities in a chordwise direction.

In a fifth embodiment the source for the hot anti-icing air is changed from engine bleed air to air compressed by a (electric motor driven compressor, with the temperature augmented by an electric duct heater. As shown herein, this fifth embodiment is a variation of the first embodiment.

In this embodiment the motor driven compressor for anti-icing air can be used in a dual function for the boundary layer suction mode. Furthermore, by providing a multitude of these units per wing surface, i.e. one unit per length of one Krueger flap panel, this system can be made modular. This reduces the complexity of the ducting, eliminates ducting in the are of the Krueger support and actuation and provides redundancy in both operating modes. Numerical designations similar to those components, with the numeral "2" being added as a prefix to the double digit notation of the first embodiment.

Figure 9:
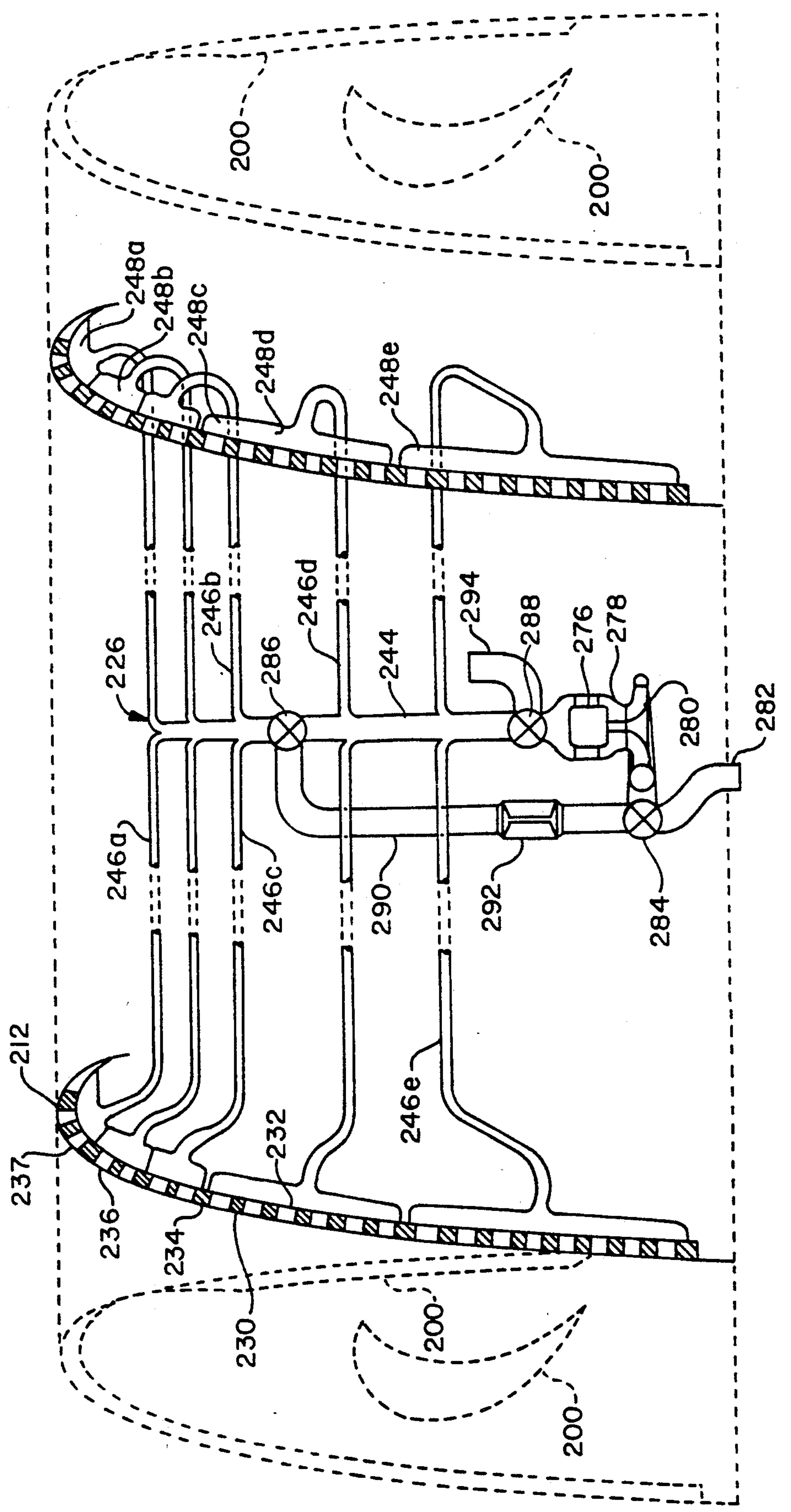
FIG. 9 is a diagramatic view of a fifth embodiment incorporating a flow distribution system for hybrid laminar flow control and anti-icing where the power source for both operating modes is an electrically driven compressor and where the suction/blowing functions are modularized.

FIG. 9 shows such a modular system applied to a system similar to the first embodiment. In FIG. 9, there is shown somewhat schematically the fixed leading edge of a wing 212, extending over the spanwise length of one Krueger flap element 200. The fixed leading edge is identical to the leading edge shown in FIGS. 1, 2 and 5. It has a perforated outer skin 230, an inner skin 232 and spanwise stringers 234, forming spanwise suction flutes 236. It has two sets of five chordwise collector ducts 248 *a, b, c, d, e*, each set being located slightly inboard of the two Krueger support and actuation locations. (Krueger support at about 21% of Krueger span, collectors at about 25%). The manifold system 226 comprises a main duct 244 which is connected to the two sets of collectors 248 with two sets of five spanwise ducts 246 *a, b, c, d, e*. The main duct leads to the motor/compressor module 278, comprising n electric motor 76 and a compressor 280, which is directly attached to the motor. Downstream of the compressor there is an exhaust nozzle 282, which may be located on the lower surface of the forward wing and would be facing aft. There are 3 three-way valves in the main duct 244. The valve 284 downstream of the compressor 280 allows the flow to be directed either out the exhaust nozzle 282 or into a bypass duct 290. Located in the bypass 290 is an electric resistance duct heater 292. The bypass duct 290 joins the main duct 244 at a location between the duct junctions of 246 *d* and 246 *c* with a three-way valve 286. The third three-way valve 288 is upstream of the motor/compressor module 278 and permits the closing of the main duct 244 and to connect to an inlet 294. This inlet 294 is located inside the leading edge cavity, which has vent and drain holes on the lower aft surface.

In the boundary layer control mode(suction mode), the three valves in the main duct 244 are all turned open for a straight passage through the main duct. Air is sucked through the perforations 237 in the leading edge skin 230 into the spanwise flutes 236. Through controlled orifices in the inner skin the air enters the two sets of collectors 248 *a–e*, which duct the flow through the ducts 246 *a–e* to the main duct 244 at the center of each module. The main duct 244 leads around the motor 276 for cooling and into the compressor 280 which acts as suction pump, from where it is exhausted overboard through the exhaust nozzle 282. In the boundary layer control mode the bypass duct 290 is closed off by the two three-way valves 284 and 286. Also closed off is the inlet 294 with valve 288.

In the anti-icing mode of operation the three valves 284, 286, 288 are turned in the other directions, opening up the inlet 294 and bypass duct 290, while closing off the exhaust nozzle 282 and the portion of the main duct 244 that is located between valves 284 and 286. Air enters the system through inlet 294 in the leading edge cavity. It flows around the electric motor 276 for cooling, is compressed in compressor 280 and flows into bypass duct 290, where the duct heater 292 augments the temperature rise from compression to the temperature desired for anti-icing. The hot air flows through the forward three ducts 246 *a, b,* and *c* into the collectors 248 *a, b,* and *c*, into the flutes 236 and through the perforations 237 into the boundary layer of the wing leading edge. The leading edge configuration of this variation is assumed to be identical to the one shown in FIG. 5, with a check valve 94 opening up an anti-icing flute below and aft of the leading edge.

Figure 10:
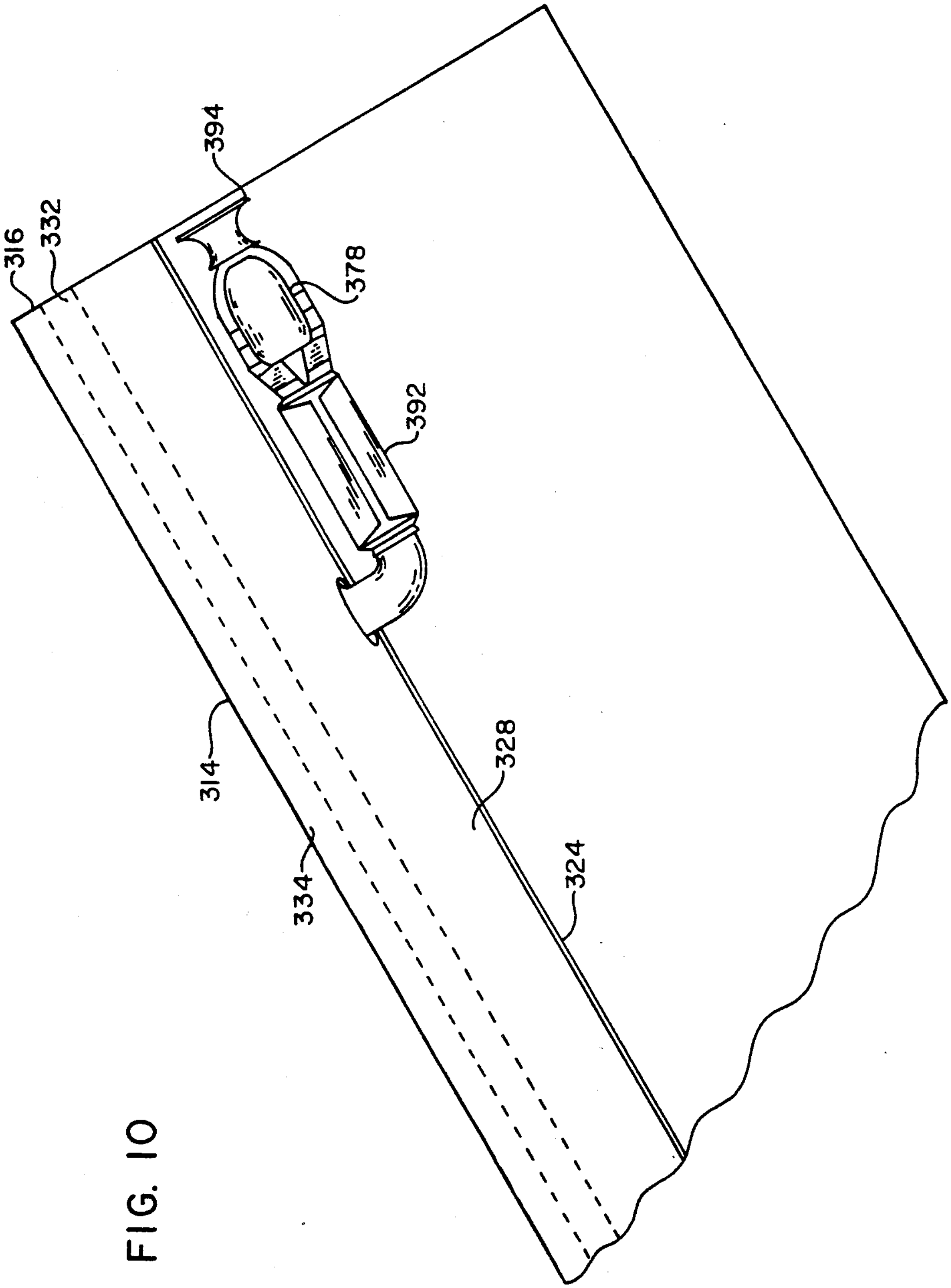
FIG. 10 shows a plan view of a slat with an anti-icing system of the fifth embodiment, where the power source for anti-icing is a modularized, electric motor driven compressor with electric duct heater.

FIG. 10 shows a sixth embodiment, which is an application of the modular motor driven compressor/heater concept to a wing leading edge slat, such as shown in the second embodiment of this present invention. What is shown is the plan view of a leading edge slat 314, having a nose section 316 and a spanwise spar 324. The cross section of this slat is identical to the slat cross section shown in FIG. 6. The only difference is that the air source for anti-icing in FIG. 10 is not engine bleed air, but hot air produced by a motor driven compressor 378 and augmented by an electric duct heater 392. This system is shown mounted to the backside of the spar 324 with the inlet 394 drawing air from the cavity between slat and fixed leading edge. The exhaust from this system, air at a pressure of 10–15 PSI over ambient and a temperature of 200° to 300° F., is ducted into the rearmost duct 328 of the slat leading edge cavity, which is equivalent to duct 128 in FIG. 6. From there the hot air travels into the remaining 2 ducts 332 and 334, and is injected into the boundary layer of the slat leading edge through the perforated leading edge skin, in the same manner shown in FIG. 6.

The modular concept can obviously be applied with equal merits to the third embodiment of this invention, i.e. leading edges of vertical tails, struts, leading edges of horizontal tails and engine inlets. The advantage of using an electric motor driven compressor and electric duct heater to supply hot anti-icing air is that this system can be modulated, i.e. massflow, pressure and temperature can be changed to meet the requirements for anti-icing. In contrast, engine bleed air comes at whatever pressure and temperature the engine power setting dictates. In most cases pressure has to be throttled back and temperature lowered in pre-coolers before the bleed air is usable for anti-icing. So there is a big waste of energy when using bleed air for anti-icing, which results in substantial engine thrust losses. Also, the bleed air system is generally sized for the most stringent anti-icing case so in less demanding situations this system exceeds the anti-icing requirements, causing more energy waste. The hot air source of this invention avoids all of this waste, because pressure/massflow and temperature can be regulated independent of each other to produce the most efficient combination for the anti-icing task and never exceeding the re2requirements.

The electrically powered anti-icing air generating system lends itself to a modular approach. Each module supplies hot air to a small portion of leading edge, so the ducting is simple. In the case of slats, this concept eliminates the need for trombone supply ducts (ducts between the fixed leading edge and the moving slat) and ducts between slats. The modular concept provides redundancy, i.e. failure of one unit is not dispatch limiting. Replacement of a module in case of failure is easy.

As to the benefits of the hot air injection anti-icing scheme, a preliminary heat transfer analysis shows that there is a significant reduction in the external heat transfer coefficient by utilizing the present invention. The external surface of the skin is effectively insulated by the hot air injected into the boundary layer. Based upon experimental data, the reduction In the external heat transfer coefficient can be as much as 46%, when the present invention is compared with a comparable prior art system where hot air is sprayed against the interior surface of the skin at the leading edge so that the heat is conducted through the skin. The benefit of the present invention is that it decreases convective losses (in comparison to that prior art system) and requires a reduced mass flow (bleed air), assuming an identical anti-icing case.

An exploratory wind tunnel test was conducted in the Boeing Icing Research Tunnel to prove the feasibility of the present invention. There was provided a model which was representative of the leading edge of the Boeing 757 outboard wing with perforated titanium skin covering the forward region. Two skin configurations were tested. The first skin had circular holes with a diameter of 0.005 inch, with the holes being spaced from one another (measured from center to center) at 0.05 inches, and with a skin thickness of 0.040 inches. The second skin section was formed with holes of 0.0039 inch diameter, with the spacing of the holes being 0.032 inches and the thickness of the skin being 0.025 inch.

The test parameters were the following: an airspeed of 170 MPH; outside air temperature ranging from plus 20° F. and minus 20° F.; liquid water content from 0.15 grams per cubic meter to 0.05 grams per cubic meter; water droplet size was twenty microns; anti-icing air temperatures were at 200° F. and 350° F. in the supply duct; and the flow rate of anti-icing air was 3.6 pounds per minute per square foot of area.

A comparison of the energy requirements of the system of the present invention constructed in accordance with the wind tunnel test indicated above, relative to a comparable prior art system using the conventional technique of spraying hot air from a tube against inside surface of the skin at the leading edge verified the analysis and indicated that due to the higher efficiency the present invention requires only 50-60% of the mass flow of a typical prior art system.

The arrangement and shape of the openings 37 in the outer skin section 30 in the first embodiment, i.e. the boundary layer control system, are dictated by the boundary layer control requirements. In the vicinity of the leading edge, where the boundary layer is very thin, the size of the openings has to be as small as possible and the hole spacing tight (hole diameter as low as 0.0015 inches, spacing as low as 0.01 inches), to minimize the disturbance of the thin boundary layer. The holes are preferably circular Other shapes are possible, but the circular hole minimizes the chances for fatigue cracking of the skin. The holes are generally slightly conical with the smaller opening on the outer surface so as to minimize the chances of hole plugging with dust particles. That is the reason why a filter is needed in the supply line for anti-icing air. Farther downstream from the leading edge, where the boundary layer has grown to some thickness the size of the holes can be larger and the spacing can be increased (0.0025 to 0.005 inches diameter, 0.025 to 0.05 inches spacing). The anti-icing system utilized the hole size and spacing as optimized for the boundary layer control case.

In the case of a pure anti-icing system without boundary layer control function (embodiments 2, 3, and 4), the holes can be optimized for the anti-icing case. Again, the holes are preferably circular. Their size could be somewhat larger (0.0025 to 0.005 inches dia., 0.025 to 0.05 inches spacing). The holes would again be conical, in the pure anti-icing case the smaller diameter of the cone should be on the inside of the skin. As was mentioned in the description of FIGS. 6, 7, and 8, the flow rate requirements vary chordwise, i.e. the highest flow rates are required at the very leading edge, with diminishing rates downstream. This would call for variable hole spacing, which can be done with electronically controlled perforation machinery. However, manufacturing cost considerations may favor a uniform perforation pattern. In this case the varying flowrate requirements can be accomplished by selectively blocking holes by means of blocking strips. These blocking strips may vary in width and they may be spaced apart at varying distances to accomplish the optimum eflux pattern for anti-icing.

The flow properties for anti-icing may vary over a fairly wide range. Engine bleed air exits the pre-cooler at temperatures ranging from 250° F. to 500° F. and pressures ranging from 25 PSI to 50 PSI, depending on engine power setting and bleed port used. The bonded leading edge structure of the fist embodiment is only good for temperature up to say 280° F. So the bleed air has to be cooled down in an additional heat exchanger (54 of FIG. 2) under most engine operating conditions. To make up for the lower temperature the mass flow has to be increased to say 4.0 LB/Min/FT/.

However, if the same bleed air is used in embodiments 2, 3, or 4, where there is no bonded structure and the structure can tolerate temperatures up to 400° F., no additional cooling is required. The higher supply temperature allows a reduction in mass flow, say down to 2 LB/Min/FT.

When using the electric motor driven compressor and duct heater as an air source for anti-icing, an even larger spectrum of parameters for the air supply is possible. The electric motor driven compressor and duct heater combination allow trades between temperature, pressure and mass flow. The range envisioned is 200° to 400° F. for temperature, 10 to 20 PSI for pressure and 1.5-5 LB/Min/FT for mass flow.

In the case of the first embodiment the bonded leading edge structure would limit the supply temperature to say 280° F. For the second, third and fourth embodiment the supply temperature could be raised to say 350° F. for aluminum leading edge skin and to 400° F. (fire safety limit, not structural limit) for titanium leading edge skin. Mass flows would be adjusted to provide the right amount of total energy, i.e. high temperature with low mass flow, lower temperature with higher mass flow.

It is to be understood various modifications could be made without departing from the basic teachings of the present invention.

What is claimed:

1. An anti-icing apparatus for an aircraft, said apparatus comprising:

a. an aircraft structure comprising a skin section with a leading edge and with a first forwardly facing leading edge surface portion which is that portion of said skin section most susceptible to icing, and a second surface portion which extends rearwardly from the first leading edge surface portion to receive air flow from said first leading edge surface portion and which is less susceptible to icing;

b. said first leading edge surface portion being formed with a plurality of through air openings which are located over a substantial surface area of said first leading edge surface portion and which lead from an inside location of said skin section to an outside location of said skin section;

c. air flow means to deliver pressurized hot air to said inside location to cause said pressurized hot air to flow outwardly through said air openings over said first surface portion, heating said first surface portions and adjacent boundary layer flow to inhibit icing on said first surface portion, said hot air to then flow rearwardly over said second surface portion at a flow volume and temperature sufficient to also inhibit icing on said second surface portion;

d. said air supply means being also arranged with suction means to create a lower pressure at said inside location in a manner that boundary layer air is drawn inwardly through at least some of said air openings.

2. The apparatus as recited in claim 1, wherein said air flow means is arranged to supply said pressurized hot air for anti-icing only through a first region of said skin section which is most susceptible to icing, and to draw said outside air through air openings in at least a part of said first region and also through air openings in a second region of said skin section through which anti-icing air is not passed.

3. The apparatus as recited in claim 2, wherein said air flow means comprises a manifold system which comprises a plurality of duct sections connecting to related area portions of said skin sections, said air flow means further comprising valve means operatively connected to said duct sections to control air flow through said duct sections.

4. The apparatus as recited in claim 3, wherein said airflow means further comprises pump means to create low pressure in said manifold system and thus draw outside air inwardly through said air openings.

5. The apparatus as recited in claim 1, wherein said airflow means comprises manifold means having a plurality of duct sections at locations along said skin section and spaced from one another in a chordwise direction, which at least one of said duct sections is positioned at said first forwardly facing leading edge surface portion to deliver said hot pressurized air thereto, while another of said duct sections is positioned at another location of said skin section to deliver pressurized hot air thereto.

6. The apparatus as recited in claim 5, wherein said duct sections are located in sets of duct sections positioned at spaced spanwise locations along said aircraft structure.

7. The apparatus as recited in claim 5, wherein there is check valve means provided for at least one of said duct sections to permit outflow of pressurized hot air through a region of said air openings, while preventing flow of outside air inwardly through the openings at said region of said air openings, said air flow means being arranged to draw outside air inwardly through at least some of said air openings for boundary layer control.

8. The apparatus as recited in claim 1, wherein said skin section has first, second and third regions, said first and second regions being more susceptible to icing, and said first and third regions being desired regions for boundary layer control, said airflow means being arranged to delivery hot pressurized air through openings in said first and second regions, but not said third region, said airflow means also being arranged to draw air inwardly through said openings at said first and third regions, but not through openings at said second region.

9. The apparatus as recited in claim 8, wherein said aircraft structure is an airfoil, having an airfoil leading edge, an upper surface, and a lower surface arranged to create lift in an upward direction, said first region being located at the leading edge of the airfoil, said second region being located adjacent said first region and downwardly thereof, said third region being positioned rearwardly of said first region on an upper surface portion of said airfoil.

10. The apparatus as recited in claim 1, wherein said skin section comprises an outer skin portion through which said air openings are formed, and an inner skin portion spaced inwardly from said outward skin portion, said skin section also comprising a plurality of stringers positioned between first set of outer and inner skin portions to define with said outer and inner skin portions a plurality of flutes to receive hot pressurized air therein.

11. The apparatus as recited in claim 1, further comprising hot air supply means to provide said hot pressurized air, said hot air supply means comprising an electrical resistance heating means and compressor means to cause airflow through said electrical resistance heating means to be heated thereby and to be provided for said airflow means.

12. The apparatus as recited in claim 11, wherein said compressor means can operate in a first mode to cause air to flow through said electrical resistance heating means for de-icing, and in a second mode to draw boundary layer air inwardly through said air openings.

13. The apparatus as recited in claim 12, further comprising valve means which have a first operating mode in which hot pressurized air is delivered through said openings, and in which ambient air is caused to flow through said compressor means, through said electrical resistance heating means to said skin section, and operating in a second mode in which air is drawn inwardly through said air openings, to pass through said compressor into ambient atmosphere.

14. The apparatus as recited in claim 13, wherein said valve means is arranged to operate in said second mode of operation so that air passes through said compressor to said outlet means while bypassing said electrical resistance heating means.

15. An anti-icing apparatus for an aircraft, said apparatus comprising:

a. an aircraft structure comprising a metal skin section with a leading edge and with a first forwardly facing leading edge surface portion which is that portion of said skin section more susceptible to icing, and a second surface portion which extends rearwardly from the first leading edge surface portion to receive air flow from said first leading edge surface portion and which is less susceptible to icing;

b. said first leading edge surface portion being formed with a plurality of through air openings which are located over a substantial surface area of said first leading edge surface portion and which lead from an inside location of said skin section to an outside location of said skin section;

c. air flow means to deliver pressurized hot air to said inside location to cause said pressurized hot air to flow outwardly through said air openings over said first surface portion, heating said first surface portions and adjacent boundary layer flow to inhibit icing on said first surface portion, said hot air to then flow rearwardly over said second surface portion at a flow volume and temperature sufficient to also inhibit icing on said second surface portion;

d. baffle means positioned at said inside location of said skin section to provide at least first and second air chambers to receive said pressurized hot air and deliver said pressurized hot air through first and second skin regions adjacent to said first and second chambers, respectively, said first surface region being positioned to experience lower outside pressure levels during flight than said second surface region, said air flow means being arranged to supply said hot pressurized air to said first chamber, check valve means operatively positioned between said first and second chambers to permit hot pressurized air to flow from said first chamber to said second chamber, but to prevent reverse flow from said second chamber to said first chamber, whereby during periods when pressurized hot air is not delivered to said first chamber, outside air is prevented from flowing into said second chamber to said first chamber.

16. The apparatus as recited in claim 15, wherein said baffle means defines a third chamber having check valve means to receive pressurized hot air from said first chamber, but preventing flow of air from said third chamber back to said first chamber.

17. The apparatus as recited in claim 16, wherein second check valve means and baffle means are arranged so that flow from said first chamber is through said second chamber and thence to said third chamber.

18. An anti-icing apparatus for an aircraft, said apparatus comprising:

a. an aircraft structure comprising a metal skin section with a leading edge and with a first forwardly facing leading edge surface portion which is that portion of said skin section more susceptible to icing and which is directly exposed to ambient atmosphere, and a second surface portion which extends rearwardly from the first leading edge surface portion to receive air flow from said first leading edge surface portion and which is less susceptible to icing;

b. said first leading edge surface portion being formed with a plurality of through air openings which are located over a substantial surface area of said first leading edge surface portion and which lead from an inside location of said skin section to an outside location of said skin section, said air openings having sufficiently small width dimensions so as not to cause substantial disturbance to boundary layer flow over said first forwardly facing leading edge surface, and said openings being spaced sufficiently close together so as to permit adequate flow of de-icing air through said openings to accomplish de-icing;

c. air flow means to deliver pressurized hot air to said inside location to cause said pressurized hot air to flow outwardly through said air openings over said first surface portion, heating said first surface portions and adjacent boundary layer flow to inhibit icing on said first surface portion, said hot air to then flow rearwardly over said second surface portion at a flow volume and temperature sufficient to also inhibit icing on said second surface portion.

19. The apparatus as recited in claim 18, wherein the width dimension of said openings is no greater than about one two-hundredths inch diameter.

20. The apparatus as recited in claim 19, wherein the spacing between said openings is no greater than about one-twentieth of an inch.

21. The apparatus as recited in claim 18, wherein the spacing between said openings is no greater than about one-twentieth of an inch.

22. The apparatus as recited in claim 18 wherein said aircraft structure is an airfoil where the leading edge surface portion has an upper surface area experiencing less pressure during flight and a lower leading edge surface area experiencing greater pressure in flight, said apparatus having means to inhibit flow through openings in said lower area to openings in said upper area.

23. The apparatus as recited in claim 22, wherein said means to inhibit flow comprises a baffle structure.

* * * * *